Oct. 8, 1929.  H. HUMPHREYS  1,730,730
MAGNETIC CHUCK
Filed Oct. 17, 1927
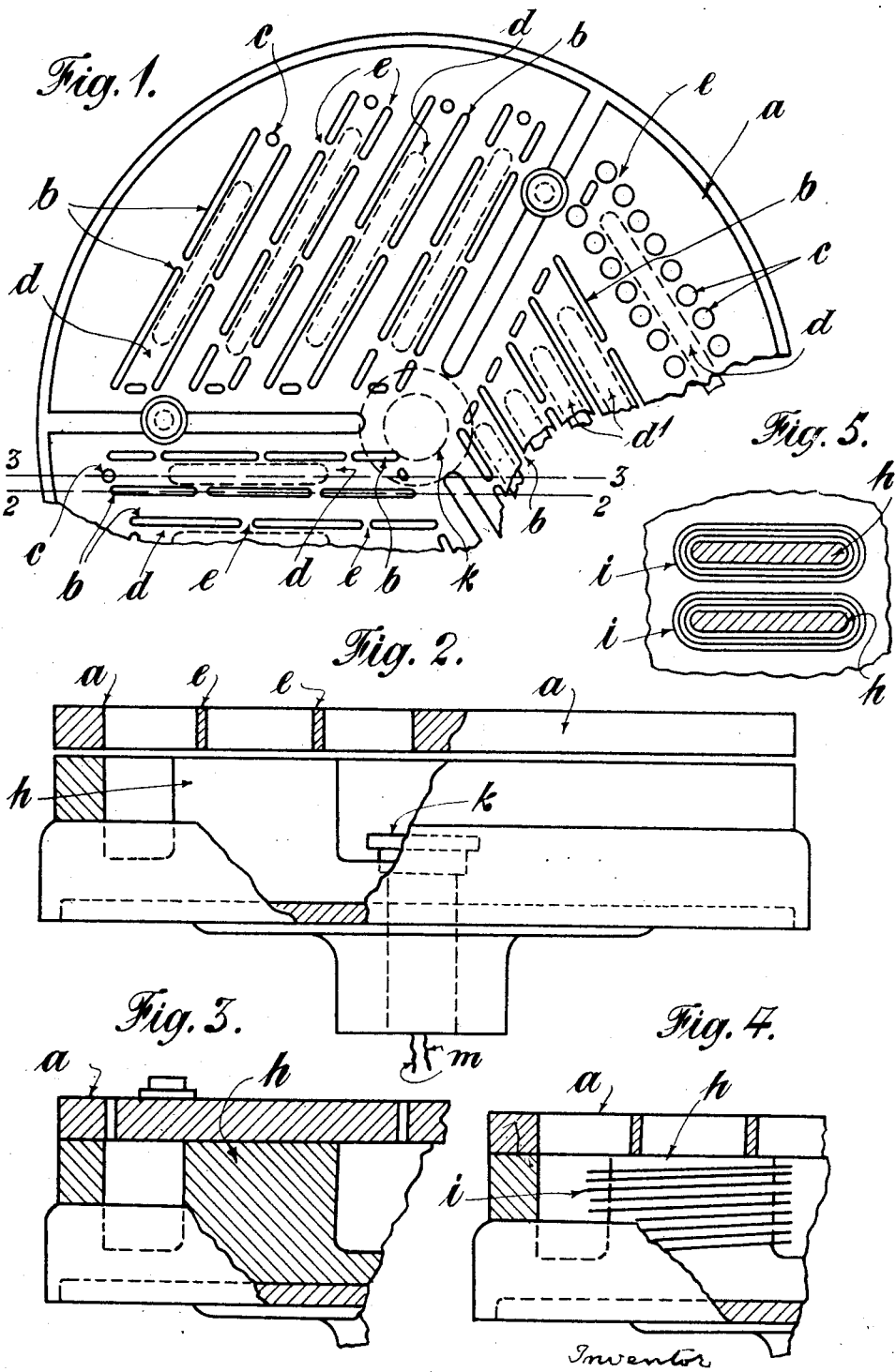

Patented Oct. 8, 1929

1,730,730

UNITED STATES PATENT OFFICE

HENRY HUMPHREYS, OF OLDHAM, ENGLAND

MAGNETIC CHUCK

Application filed October 17, 1927. Serial No. 226,696, and in Great Britain November 18, 1926.

The invention relates to magnetic chucks or workholders, which are used to hold pieces or parts of metal of magnetic susceptibility, when said pieces or parts are subjected to such as milling, grinding, or abrasive or lapping operations.

The working face of this kind of chuck is generally constructed of a plate or frame, apertures in which contain pole pieces of iron capable of being made magnetic by suitably connected electro-magnets. The poles are magnetically insulated from the remainder of the pole face of the chuck by white metal run into cavities passing completely round said poles.

The object of the present invention is to make the poles and other portions of the pole face or working face of the chuck of the same piece of metal, or the said poles are integral with such other portions referred to, whether the latter be other poles or not.

In accomplishing said invention, I provide a face plate for containing the pole faces of the chuck with separated holes, or discontinuous slots or apertures, the metal of the face plate between the terminations of the adjacent slots or apertures being very small comparatively speaking, but sufficient to enable the whole plate so slotted to hold together in practical manner. The apertures are therefore here stated to be closely-discontinuous, as will be seen from the drawings, hereinafter described. Groups of these apertures outline or partly enclose areas which form the pole areas of the face-plate named.

The apertures themselves, may be filled with white metal or other non-magnetic or dia-magnetic substance, although the effect desired is satisfactory even when said apertures are left filled with air.

The under side of the face plate is in close contact with pole pieces, the latter capable of being rendered magnetic or formed as electromagnets in known manner, and when said magnetized poles are situated adjacent to the pole areas named, the latter are found also to become magnetized, the leakage through the small connecting bridges between aperture terminations, being of very little practical importance.

Where pole areas are close together I prefer to employ windings for the magnets which will under excitation provide north and south pole areas alternately. But in some cases, all the pole areas may be of like polarity, the non-enclosed areas and casing of the chuck being of sufficient section to return the magnetism from all the pole areas referred to.

With reference to the accompanying drawings, Fig. 1 is a front view of a portion of the pole face or working face of a circular form of chuck composed of metal of suitable magnetic permeability, showing various forms of my invention applied thereto, as examples merely, and it is obvious that an actual chuck may be provided with poles arranged according to one form only thereof, or, alternatively, with a combination of forms.

Fig. 2 is a sectional elevation or edge view of Fig. 1, the sectional portions being taken through line 2—2 of said Fig. 1.

Fig. 3 is a portion of a similar view, the section being taken through line 3—3 of said Fig. 1.

Fig. 4 is partly a repeat of a portion of Fig. 1, but showing, in diagram form only, an electro-magnet applied to a pole piece indicated, wire connections being omitted.

In the foregoing Figs. 2 to 4 inclusive, the working face of the chuck is shown detached slightly from the remainder of the chuck in Fig. 2, but in contact therewith in the cases of Figs. 3 and 4.

Fig. 5 is an under-sectional plan view of a pair of pole pieces with windings about the same forming electro-magnets when an electric current is passed therethrough, as well understood.

$a$ is the face plate containing pole faces of the chuck, which plate is shown provided with discontinuous slots $b$, and separated holes $c$ according to forms of my invention.

That is to say, groups of these apertures mark out or follow the outlines of the pole areas such as $d$ for example to be rendered magnetic in each case. Other pole areas are indicated at $d^1$. In the majority of cases shown, the poles $d$ are separated from each other by metal, other than poles, between. But in the case of the poles $d^1$ these are seen to be adjacent to each other, with only apertures, such as b, between.

In all cases, said apertures could be filled or supplied with white metal or suitable substance as already stated.

Small connecting bridges of metal between the various apertures such as b and c, are shown at e.

Below the face plate of the chuck, and forming part of remaining portions of said chuck, are pole pieces h, with the upper faces of which the metal of the pole area or face a in each case is capable of making close contact, and so that when energized electro-magnets (such as indicated in diagram form at i) are situated about said pole pieces, the poles become magnetic for the purpose intended. This contact may be attained with the use of screws, bolts or as convenient as will be seen from Fig. 1. But the manner of application and arrangement of the electro-magnets do not affect my invention. In the example given, leads from the various electro-magnets are assumed to be brought to one central plug k, said leads being partly indicated at m in Fig. 2 as they pass from k to some suitable source of electricity or make circuit therewith. This arrangement is however only by way of example; and for a similar reason the invention is shown applied to a circular form of chuck only, without intention of being confined thereto.

I claim:—

1. A magnetic chuck, comprising a one-piece face plate with closely-discontinuous apertures therethrough, pole areas partly enclosed by groups of said apertures, pole pieces in close contact with the underside of said face plate and adjacent to the pole areas named, said pole pieces capable of being rendered magnetic and whereby the pole areas on the face plate are also rendered magnetic, substantially as herein set forth.

2. A magnetic chuck, comprising a one-piece face plate with closely-discontinuous apertures therethrough, non-magnetic or diamagnetic filling in said apertures, pole areas partly enclosed by groups of said apertures, pole pieces in close contact with the underside of said face plate and adjacent to the areas named, said pole pieces provided as electro-magnets, and whereby the pole areas on the face plate are rendered magnetic, substantially as herein set forth.

In testimony whereof I have affixed my signature.

HENRY HUMPHREYS.